US010754912B2

(12) United States Patent
Novielli et al.

(10) Patent No.: US 10,754,912 B2
(45) Date of Patent: Aug. 25, 2020

(54) MACHINE LEARNING MODEL TO PRELOAD SEARCH RESULTS

(71) Applicant: Microsoft Technology Licensing, LLC, Redmond, WA (US)

(72) Inventors: Nathan Novielli, Kirkland, WA (US); Yan Zhong, Bellevue, WA (US); Paul Baecke, London (GB); Sean Lyndersay, Sammamish, WA (US); David Sheldon, Redmond, WA (US); Malik Mehdi Pradhan, Kirkland, WA (US); Dheeraj Mehta, Redmond, WA (US); Daniel Hill, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 240 days.

(21) Appl. No.: 15/919,065

(22) Filed: Mar. 12, 2018

(65) Prior Publication Data

US 2019/0278870 A1    Sep. 12, 2019

(51) Int. Cl.
*G06F 17/00*    (2019.01)
*G06F 16/957*    (2019.01)
(Continued)

(52) U.S. Cl.
CPC .... *G06F 16/9574* (2019.01); *G06F 16/24575* (2019.01); *G06F 16/951* (2019.01); *G06F 16/955* (2019.01); *G06N 20/00* (2019.01)

(58) Field of Classification Search
CPC .............. G06F 16/9574; G06F 16/955; G06F 16/24575; G06F 16/951; G06N 20/00
See application file for complete search history.

(56) References Cited

U.S. PATENT DOCUMENTS

| 2010/0070334 A1 | 3/2010 | Monteverde |
| 2010/0174735 A1 | 7/2010 | Fiatal |

(Continued)

FOREIGN PATENT DOCUMENTS

CN    105095289 A    11/2015

OTHER PUBLICATIONS

"International Search Report and Written Opinion Issued in PCT Application No. PCT/US19/020850", dated May 8, 2019, 13 Pages.

(Continued)

*Primary Examiner* — Tyler J Torgrimson
(74) *Attorney, Agent, or Firm* — Medley, Behrens & Lewis, LLC (57) ABSTRACT

Representative embodiments disclose mechanisms to improve the perceived responsiveness of a search engine. As a user types a query prefix into a browser or other interface to the search engine, the search engine returns query completion suggestions to the browser. The query completion suggestions, user history, user favorites and/or other information are presented to a trained machine learning model on the client device to predict a desired location that the user is attempting to navigate to. When the confidence level of the predicted location surpasses a threshold, content from the desired location is preloaded into a hidden tab in the browser. When the user submits a query, the browser submits feedback to a system responsible for updating and refining the machine learning model. Updated machine learning model coefficients can be received by the browser from the system to make predictions more accurate.

20 Claims, 6 Drawing Sheets

(51) Int. Cl.
  *G06N 20/00*     (2019.01)
  *G06F 16/951*    (2019.01)
  *G06F 16/955*    (2019.01)
  *G06F 16/2457*   (2019.01)

(56) References Cited

U.S. PATENT DOCUMENTS

2011/0072033 A1* 3/2011 White ................. G06F 16/3322
                                                  707/768
2016/0275194 A1* 9/2016 Borza .................... H04L 67/22
2017/0024487 A1* 1/2017 Stefanov ............. G06F 16/9574

OTHER PUBLICATIONS

White, et al., "Search Result Prefetching on Desktop and Mobile", In Journal of ACM Transactions on Information Systems, vol. 35, Issue 3, Jun. 9, 2017, 34 Pages.

* cited by examiner

MACHINE LEARNING MODEL TO PRELOAD SEARCH RESULTS

FIELD

This application relates generally to pre-loading search results. More specifically, this application relates to using a user-specific trained machine learning model to predict a desired search result and pre-load it in a browser.

BACKGROUND

A key challenge for search engine performance is to display search results as soon as possible after a user submits a query to the search engine. This is particularly important where the communication channel between the search engine and the user device relies on a slower data speed or where the computing power on the user device results in slower processing and display of search results on the user device.

It is within this context that the present embodiments arise.

DETAILED DESCRIPTION

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

The following overview is provided to introduce a selection of concepts in a simplified form that are further described below in the Description. This overview is not intended to identify key features or essential features of the claimed subject matter, nor is it intended to be used to limit the scope of the claimed subject matter. Its sole purpose is to present some concepts in a simplified form as a prelude to the more detailed description that is presented later.

Embodiments of the present disclosure include a user device that comprises a browser or other program (hereinafter "browser") to interface with a search system. The user browser receives a partial query (hereinafter "query prefix") and submits it to the search system. The search service returns a ranked list of query completion suggestions that the search system estimates are most likely represent the query the user is attempting to enter.

The ranked list and local information is presented to a trained learning model. The local information can include one or more of user favorites, user search history, federated information that the browser has access to, and so forth. The trained machine learning model returns a list of one or more prefetch candidates. Each of the prefetch candidates can have an associated confidence level, which indicates a relative likelihood that the completed query will match the prefetch candidate.

If the confidence level crosses a threshold, the browser can initiate a prefetch request to the search service and place the results into a hidden location, such as a hidden tab in the browser, so they are not displayed to the user. If the completed query matches the prefetch candidate, the prefetched results are displayed to the user. If the completed query does not match the prefetch candidate, then the completed query is submitted to the search service and the results to the completed query displayed.

The trained machine learning model is received by the browser from a system or service that is responsible for training and distributing the machine learning models. This system can utilize data collected from user devices as feedback to train and update the machine learning models and distribute them to the user devices.

Description

Figure 1:
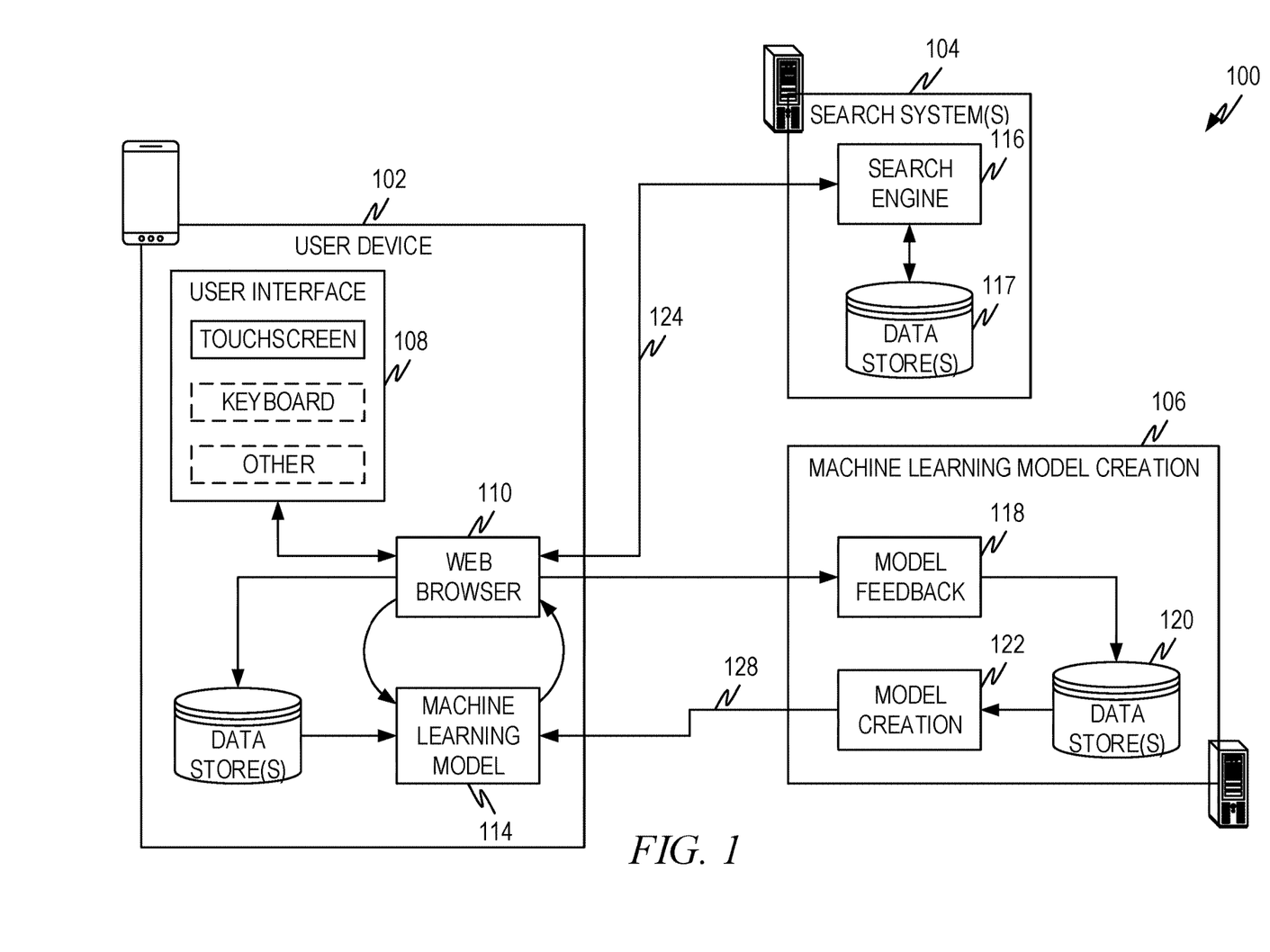
FIG. 1 illustrates a representative system architecture according to some aspects of the present disclosure.

FIG. 1 illustrates a representative system architecture 100 according to some aspects of the present disclosure. The architecture comprises a user device 102, search system(s) 104 and, a system responsible for creation and distribution of a trained machine learning model 106.

The search system is adapted to receive requests in the form of a query from user devices and provide results in response thereto. The search system can be a public system, a private system, or a combination thereof. Examples of public systems include internet search systems and/or engines and other search systems that allow users from a variety of organizations or from the public (or both) to access the search system. Private search systems are generally limited to an organization such as search systems that index content internal to an organization. In some embodiments, a public search system and/or private search system can federate with private data source(s) and/or public data source(s) so that returned results can comprise not only information from public sources but private sources as well. One way this can be implemented is to have a public search system which returns results from public source(s) federate with a private search system which returns results from private source(s). Thus, a query received by the public system can pass the query along with authentication/authorization information as appropriate to the private system, which searches appropriate private source(s). Public search results can then be combined (e.g., by the public search system) with the results returned by the private system and the combined results can be returned to the source from which the query was received.

In the context of this disclosure the term "query" is intended to be read broadly. Thus a query can comprise one or more of: search term(s), a Uniform Resource Identifier (URI), a Uniform Resource Locator (URL), a Uniform Resource Name (URN), a natural language question or query, a query created using a query language such as a Structured Query Language (SQL), and/or other indicator to the search service as to what the source of the query (e.g., a user) is seeking. Furthermore, queries can come in a variety of formats such as text, voice, gesture, and so forth.

Queries are generally recited on a user device 102 and passed to the search system 104 as indicated by 124. Results are returned to the user device 102 in response to the query. Queries received on a user device 102 are often not received as a single input. Most often queries are entered a portion at a time. A partial query that is received is referred to as a query prefix or more simply a prefix. As an example, the web browser 110 of the user device 102 can present an input box to a user via a user interface 108. The user can enter a query in text form via the user interface 108 which can comprise a touch screen, a keyboard (physical or virtual), and/or other input mechanisms. As the user enters the query a character at a time, the web browser can create a query prefix comprising the characters that have been entered so far. Queries entered in other formats may have prefixes in other formats. For example, a query entered by voice may comprise one or more utterances that represent a query prefix.

Modern search systems 104 often comprise logic that receives a query prefix and returns a list of query completion suggestions. For example, as a user types a query into a browser 110 or other program that interfaces with the search service, a list of query completion suggestions is displayed to the user, typically on the screen (via user interface 108) in a list or a dropdown box. A user can complete the query by selecting one of the suggestions. If none of the suggestions match the user's desired query, the user can continue to enter characters. The process continues until the user either selects a query completion suggestion or completes typing the desired query and indicating completion of the query such as by pressing the "enter" key or other termination indicator.

If text is not the input mechanism, the user device 102 and/or the search system 104 can convert the received input into a common format and then use the common format to generate the list of query completion suggestions. The list of query completion suggestions can be returned to the user device 102 and "displayed" to the user in either the same format as the input was received or in a different format. For example, if the user enters the query by voice (e.g., by speaking), the user device 102 can receive the utterance(s) from the user and perform speech to text recognition to generate the query prefix and pass the prefix to the search system 104. The search system 104 then returns the list of suggestions. The list of suggestions can be converted to voice/audio (i.e., by text to speech conversion) and "played" for the user or the text format can be displayed on a screen for the user. If the speech to text and text to speech do not reside on the user device 102, the utterances can be passed to the search system 104 and the query completion suggestions returned in a desired format (e.g., text and/or speech). There are numerous speech to text and text to speech conversion methodologies and such can be used herein.

In some embodiments, the entries of the ranked list of query completion suggests can have an associated confidence level that represents the likelihood that the completed query will match the query completion suggestion. When the likelihood crosses a threshold, the browser can submit the associated query completion suggestion to the search system 104 to prefetch results associated with the associated query completion suggestion. The problem with such an approach is that prefetching information that ultimately does not respond to a completed query increases the burden on the search system 104. The prefetch is "wasted" and represents an additional burden on the search system 104. Given the numbers of queries submitted to the search system 104 each second, the additional burden is not a small thing and represents a real increase in workload, network bandwidth requirements and so forth. Simple mathematics can calculate that if browsers prefetch items from the search engine and 50% of those items are incorrect (meaning that the user submits a different query and thus submits a different query to the search engine), the search engine must service ⅓ more queries, the bandwidth taken up is increased by ⅓, 50% percent of user devices process double the amount of queries, and other such effects. Thus, embodiments of this disclosure comprise additional mechanisms to reduce the incorrect prefetches, thus improving performance of the search system 104 and/or the user device 102, reducing the data transferred from the search system 104 to the user device 102, and/or reducing the processing load on both the search system 104 and the user device 102.

When the ranked list of query completion suggestions are received by the user device 102, a combination of information is presented to a trained machine learning model 114 in order to determine if a query completion suggestion and/or other local information should be used to prefetch information from search system 104. The information presented to the trained machine learning model 114 can comprise one or more of:

The query prefix;

A subset (i.e., all or part) of the ranked list of query completion suggestions;

At least one confidence level associated with entries from the list of query completion suggestions submitted to the trained machine learning model;

Local information such as one or more of user favorites, user search history, user profile information, and/or other local information; and Information from other federated data sources.

The trained machine learning model 114 can return to the browser 110 a list of one or more prefetch candidates. The entries on the list of prefetch candidates can have an associated confidence level that represent the relative likelihood that the completed query will match the prefetch candidate. The term "prefetch candidates," like queries, is intended to be interpreted broadly and, like the query, can comprise one or more of: search term(s), a URI, a URL, a URN, a natural language question or query, a query created using a query language such as a Structured Query Language (SQL), and/or other indicator to the search service as to what the source of the query (e.g., a user) is seeking.

The purpose of the machine learning model 114 is to further tailor the list of prefetch candidates using local data such as user specific data in order to make it more likely that whatever is prefetched from the search system 104 is not "wasted" but matches what would have been retrieved by the completed query. The effect of the trained machine learning model 114 can suppress a highly likely query completion suggestion as it comes from the search engine, can promote a different query suggestion (i.e., in the form of a prefetch candidate), can replace a query completion suggestion with a more likely query completion suggestion (i.e., in the form of a prefetch candidate), and/or so forth. Furthermore, confidence levels associated with the prefetch candidates can have the same or a different associated confidence level. In other words, the list of prefetch candidates output from the trained machine learning model 114 can have entries that are the same as, or different from, or both (i.e., some that are the same and some that are different), from the entries in the list of query completion suggestions submitted to the trained machine learning model 114. Additionally, or alternatively, the entries that are the same may have the same or different ranking as the input list and/or the same or different associated confidence level.

The browser 110 receives the list of prefetch candidates and when the confidence level associated with an entry exceeds a threshold (either greater that the threshold or greater than or equal to the threshold), the entry is sent to the search engine by the browser to prefetch the candidate. The results received from the search system 104 are placed into a hidden location so they are not displayed to the user. In one embodiment, the results are placed into a hidden tab in the browser 110, although other ways of placing the results in a hidden location can be utilized including holding the results locally in any type of storage. If the completed query matches the prefetch candidate, the prefetched results are displayed to the user via the user interface 108. If the completed query does not match the prefetch candidate, then the completed query is submitted to the search service and the results to the completed query are displayed.

The trained machine learning model is received by the user device 102 from a system or service 106 that is responsible for training and distributing the machine learning models. This system 106 can utilize data collected from user devices as feedback 118 to train and update the machine learning models and distribute 128 them to the user devices 102. Feedback from user devices helps the machine learning model creation system 106 can comprise one or more of:
- an indication of whether the selected prefetch candidate matched the completed query;
- the confidence level associated with the selected prefetch candidate;
- a subset of the query completion suggestion list received from the search system 104;
- the completed query;
- one or more features (title, URL, etc.) that matched and/or didn't match between the selected prefetch candidate and the completed query;
- an indication of whether a prefetch candidate was selected for retrieval (i.e., was a prefetch made);
- whether the selected prefetch candidate was drawn from local information (e.g., a favorite or an entry from the browser history);
- if a selected prefetch candidate was drawn from local information, how long ago was the selected prefetch candidate clicked on (i.e., a time measure since the user visited the selected prefetch candidate); and
- other information such as non-personally identifiable user profile information or federated information.

Feedback from the user devices 102 can be adjusted to account for privacy concerns. The list above is tailored to not include personal information from the user's device. For example, the prefetch candidate is not included but information about the prefetch candidate (e.g., confidence level, features that matched or didn't match) are included. However, from the included information, the machine learning model creation system 106 cannot ascertain exactly what the browser history of the user, the favorites of the user, and other such private information.

With the permission of the user, additional information can be collected and used to tailor the machine learning models 114. Thus, in addition to the feedback items above, feedback can additionally comprise one or more of:
- User profile information;
- User favorites;
- Browser history;
- The prefetch candidate submitted; and
- Other information.

Feedback 118 that is received from the user devices 102 can be collected and stored in a data store 120. Upon occurrence of a trigger event, the machine learning model creation system 106 can update the machine learning models and distribute them to user devices 102 using a training process and/or model creation process 122 (hereinafter model creation process). The goal of the training process 122 is to identify machine learning models that better account for the local information so that the likelihood that the completed query matches the prefetch candidate is increased.

Due to the number of queries processed each second by the search system 104 and the amount of feedback received by the machine learning model creation system 106, a sufficient amount of data to retrain the model can be received very quickly. Thus, the machine learning model can be retrained, a new model created, and so forth based on one or more trigger events. In one embodiment, the trigger event can be time so that the machine learning model is updated (i.e., an existing model retrained or a new model created) on a periodic or aperiodic schedule. In another embodiment, the trigger even can be machine learning model performance so that the machine learning model is updated when the performance falls below a threshold such as when the number or rate of incorrect prefetches exceeds a threshold and/or the number or rate of correct prefetches falls below a threshold. In yet another embodiment, performance of a test machine learning model triggers updating the machine learning model to a wider group of users (see the A/B testing discussion below). Thus, when a test machine learning model (i.e., model A) performance exceeds another deployed model (i.e., model B), the A model can be deployed to replace the B model. In other embodiments a combination of trigger events can be used.

To increase the likelihood that prefetches will be correct, the model creation process 122 can employ various strategies. For example, to the extent that users can be segmented into like cohorts (users that have one or more aspects in common) from the feedback 118 that is received from the user devices 102, models can be trained differently for different user cohorts. Additionally, or alternatively, the models can be created and/or trained in the aggregate with no user segmentation.

Another strategy that the model creation process 122 can employ is an AB testing process. Thus, a model can be trained and distributed to a group of test users and the incorrect percentage can be monitored. If the percentage of incorrect prefetches is lower in the test user group and/or the percentage of correct prefetches is higher in the test user group, the model can be distributed to a wider group and/or all users. Thus, there can be several models that are deployed simultaneously and the performance of the models monitored and the model that gives the best performance in terms of minimizing the incorrect prefetches and/or maximizing the correct prefetches utilized.

The model creation process 122 can distribute a whole new model, updated coefficients for an existing model, or both. A whole new model can be distributed in the form of a plug-in, script file, or other executable that can be executed by web browser 110. Updated coefficients can be distributed in a format that allows user device 102 to update the coefficients of an existing model. Coefficients in this context are the weights or other parameters that turn an untrained learning model into a trained learning model.

Because the feedback 118 received from the user devices 102 contain a success measure as well as input information and output information, the model creation process 122 can utilize a supervised learning technique to update a trained machine learning model or create a new machine learning model. However, in other embodiments, unsupervised learning techniques and/or semi-supervised learning techniques can be used in addition to or in lieu of supervised learning techniques.

Various machine learning models that receive an input list and output an output list can be used in embodiments of the current disclosure. Thus, appropriate models are those that are able to classify and/or rank a list of input items, including supervised, unsupervised and semi-supervised models. Various models fall into the categories such as deep learning models, ensemble models, neural networks, regularization models, rule systems, regression models, Bayesian models, decision trees, dimensionality reduction models, instance based models, and/or clustering models.

Figure 2:
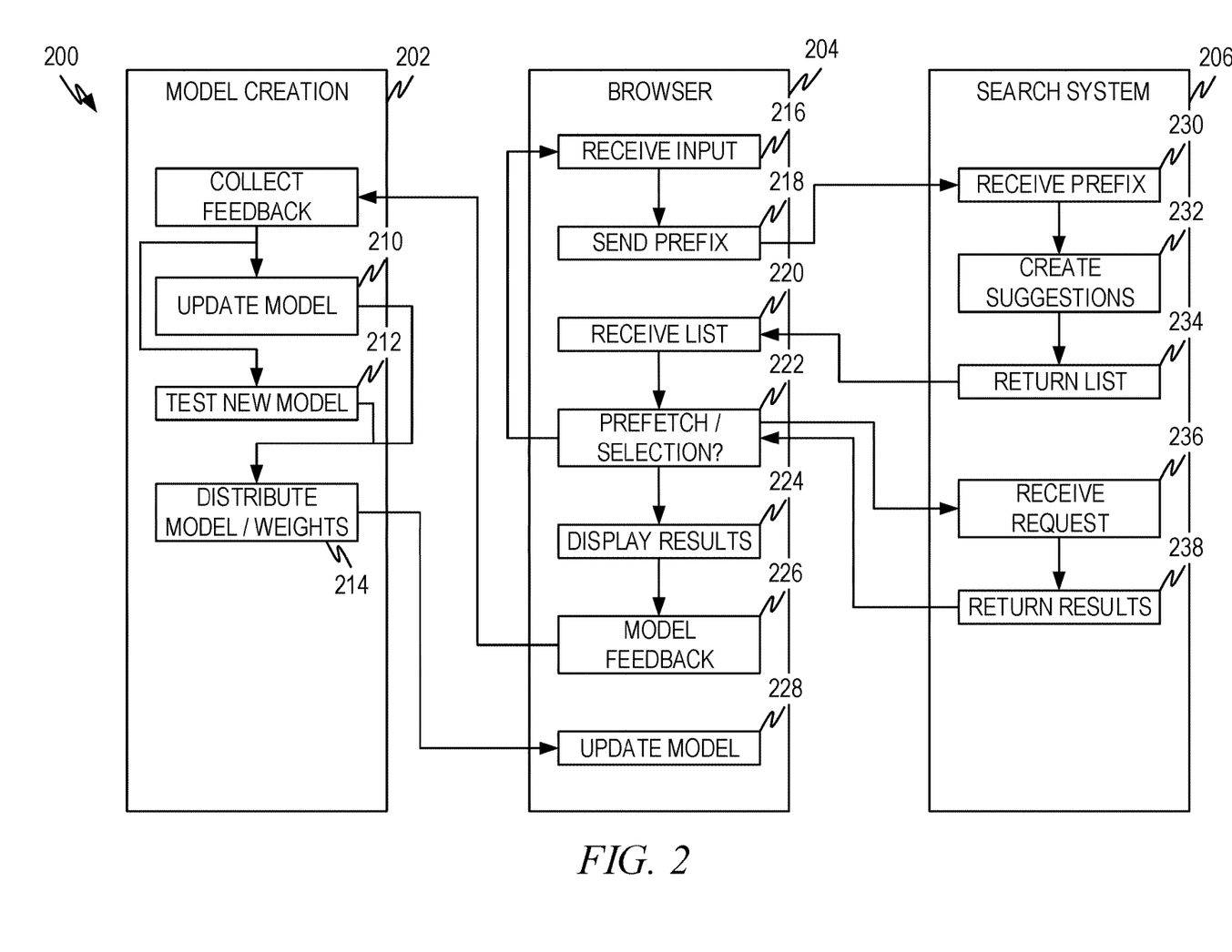
FIG. 2 illustrates a representative interaction diagram according to some aspects of the present disclosure.

FIG. 2 illustrates a representative interaction diagram 200 according to some aspects of the present disclosure. The interaction diagram 200 shows the high level interactions between the browser 204 (including the machine learning model), the search system 206, and the model creation system 202.

The browser 204 receives the input query 216 and passes the query prefix 218 to the search system, which receives the query prefix 230. Responsive to receiving the query prefix 230, the search system 206 creates a list of query completion suggestions 232 and returns the list 234 to the browser 204.

Responsive to receiving the list of query completion suggestions 220, the browser generates a list of prefetch candidates (i.e., using the trained machine learning model) and determines whether to prefetch one of the entries in the list of prefetch candidates 222. When the confidence measure associated with one of the prefetch candidates exceeds a threshold, the prefetch candidate is sent to the search system 206. Responsive to receiving the prefetch candidate 236, the search system 206 returns the results associated with the prefetch candidate 238. The browser receives the results and places them in a hidden location until the user enters the completed query.

The system repeats these operations until the user enters the completed query either by selecting one of the completion suggestions/prefetch candidates or by finishing entry of the query and indicating the query is complete (e.g., by an enter key or equivalent). If a prefetch candidate has been prefetched and if the prefetch candidate matches the completed query, the prefetched results are displayed 224. If the prefetch candidate does not match the completed query or if no prefetch candidate was prefetched, the browser submits the completed query to the search system 206. Responsive to receiving the completed query 236, the search system 206 returns the results associated with the completed query 238 and the browser displays the results 224.

The browser sends feedback 226 to the machine learning model creation system 202. Upon occurrence of a trigger event (described above) the model is updated (i.e., a new model created 212 and/or an existing model updated 210) and the new/updated model is distributed 214. As noted above, the machine learning model creation system 202 can have several different models distributed to several different user machines and/or groups of user machines.

Responsive to receiving a new model and/or updated model coefficients, the browser 204 (or the user device) updates the machine learning model 228.

Figure 3:
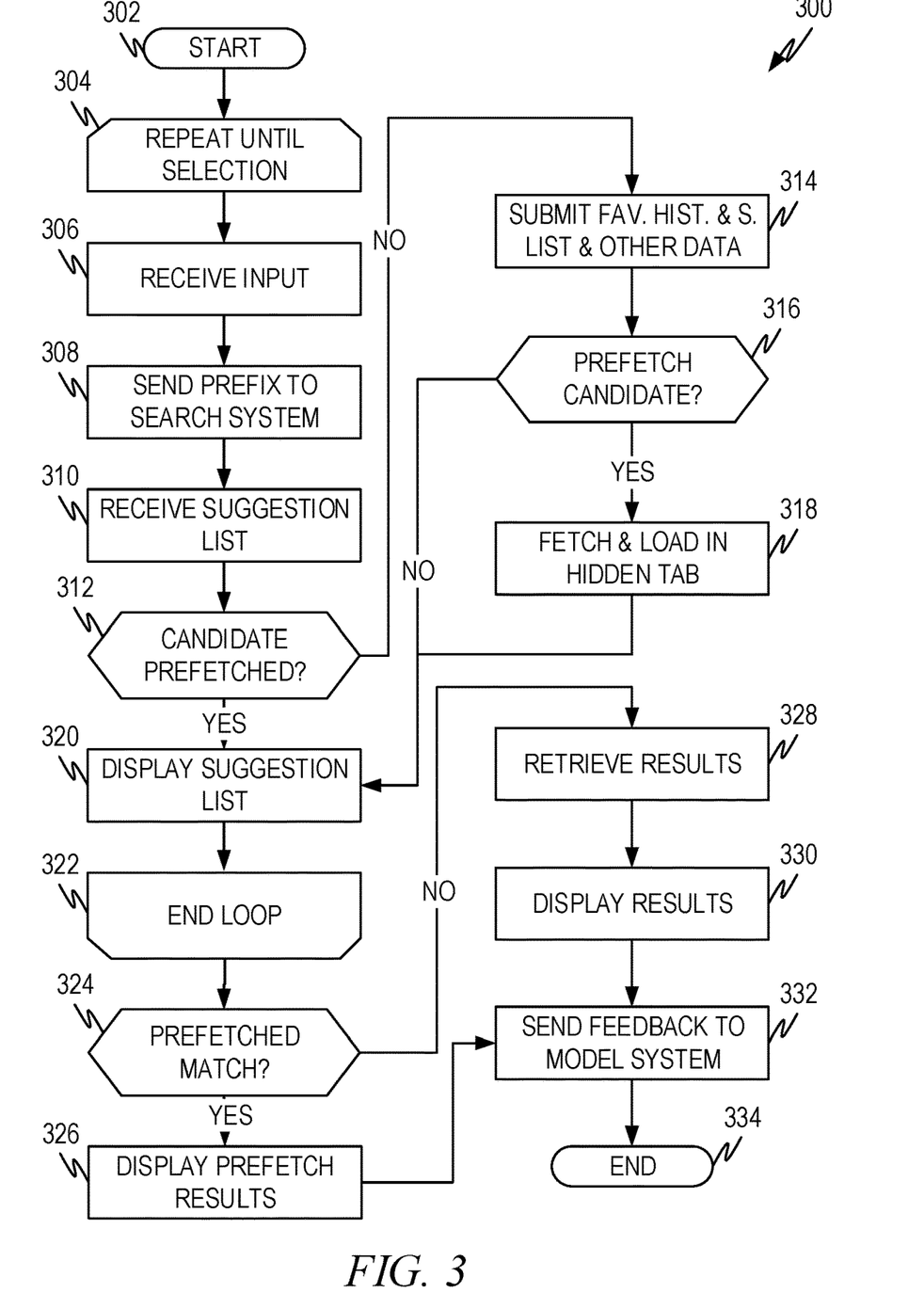
FIG. 3 illustrates a representative flow diagram for a user device according to some aspects of the present disclosure.

FIG. 3 illustrates a representative flow diagram 300 for a user device according to some aspects of the present disclosure. The flow diagram begins at operation 302 and proceeds to operation 304 which begins a loop that continues until the completed query is entered such as by a user selecting an entry on a displayed completion list, or finishing entering a query, and/or indicating the end of the query.

Input is received in operation 306. As noted above, the input can be in any format such as text, voice, gesture, and so forth. The input can signal the completed query, such as an enter key, a selection from the list of query completion candidates and/or suggestions, and so forth. In that instance the loop that begins with 304 and ends with 322 would finish and execution continues with operation 324.

If the input does not end the query (i.e., completed query), the input received thus far represents a query prefix. In operation 308, the system sends the query prefix to a search system or service such as 104 of FIG. 1. If the query prefix is not in a format that the search system can process, the query prefix can be translated into such a format either by the user device or by the search system prior to processing.

A list of query completion suggestions is received from the search system in operation 310. In some embodiments, the list of query completion suggestions is ranked, e.g., in order of likelihood that a user will select the corresponding entry to complete the query. Additionally, or alternatively, in some embodiments each entry in the list of query completion suggestions can have an associated likelihood that a user will select the corresponding entry to complete the query. The likelihood can be an absolute likelihood, such as a value between a minimum and maximum value, inclusive. Additionally, or alternatively, the likelihood can be a relative likelihood if desired. The likelihood can be received from the search system or can be calculated locally on the user device.

Operation 312 tests whether a candidate has already been prefetched. In some embodiments, the system will prefetch results associated with a single query completion candidate. In these embodiments, when a query completion candidate reaches a defined set of conditions, the query completion candidate is used to prefetch results. Once that event has happened, the system will not prefetch other results associated with a query completion candidate even if the query completion candidate also meets the prefetch qualifications. In the alternative, some embodiments can prefetch results multiple times. In these embodiments, however, there is a tradeoff between having results that a user may desire upon query completion with the additional resources used to prefetch results associated with multiple prefetch candidates. Such puts additional strain on resources as discussed above.

If results have already been prefetched, the "yes" branch is taken to operation 320, which is discussed below.

If results have not already been prefetched, the "no" branch is taken and operation 314 submits a subset (i.e., all or part) of the received suggestion list along with local information to the trained machine learning model, which produces a list of one or more query completion candidates. As noted above, the information submitted to the trained machine learning model can comprise one or more of:

The query prefix;

A subset (i.e., all or part) of the ranked list of query completion suggestions;

At least one confidence level associated with entries from the list of query completion suggestions submitted to the trained machine learning model;

Local information such as one or more of user favorites, user search history, user profile information, and/or other local information; and Information from other federated data sources.

The entries in the list of query completion candidates can have an associated likelihood measure. The likelihood can be an absolute likelihood, such as a value between a minimum and maximum value, inclusive. Additionally, or alternatively, the likelihood can be a relative such as a rank likelihood if desired.

When trained machine learning model produces the list of query completion candidates, the machine learning model can adjust the rank and/or likelihood measure associated with entries of the query completion suggestions so that an entry common to both the list of query completion candidates and the list of query completion suggestions has a different likelihood measure and/or rank on the list of query completion candidates than on the list of query completion suggestions. Additionally, or alternatively, the trained machine learning model can remove entries so that an entry in the list of query completion suggestions is not in the list of query completion candidates. Additionally, or alternatively, the trained machine learning model can add entries that were not in the list of query completion suggestions to the list of query completion candidates. In other words, the trained machine learning model can modify the rank and/or likelihood of entries in the list of query completion suggestions, can add entries not on the list of query completion suggestions, can remove entries from the list of query completion suggestions, and/or any combination thereof.

Operation 316 determines whether an entry in the list of query completion candidates meets the criteria for prefetching results associated with the query completion candidate. In some embodiments, the criteria can comprise the likelihood measure exceeding a threshold. Thus, when the likelihood measure associated with a query completion candidate exceeds a threshold, the query completion candidate can be used prefetch results. The criteria can also include additional requirements. For example, if multiple entries exceed the threshold, the completion candidate associated with the highest likelihood measure can be used to prefetch results. The criteria can also comprise rules to resolve what happens when a single candidate is to be used to prefetch results and multiple candidates have identical likelihood measures (e.g., "tie breaking" rules). For example, if multiple candidates have identical likelihood measures that would otherwise meet the prefetch criteria, the query completion candidate that matches local information such as browser history, favorites and so forth can be selected before candidates that do not match local information. Other prefetch criteria can also be used in addition to or in lieu of the criteria discussed above.

If an entry in the completion candidate list is selected by the criteria for prefetch, the "yes" branch out of operation 316 is taken to operation 318 where the prefetch candidate is submitted to the search system and the returned results are stored in a hidden location, such as a hidden tab in the browser. Execution then proceeds to operation 320.

If no entry meets the prefetch criteria, the "no" branch out of operation 316 is taken to operation 320.

Operation 320 displays the list of query completion candidates generated by operation 314 and/or query completion suggestions received by the search system in operation 310 are displayed to the user in a manner that allows the user to select one as the completed query. The way that the flow diagram 300 of FIG. 3 operates as illustrated, if results have not been prefetched, the list displayed by operation 320 is the list of query completion candidates generated by operation 314. However, if results have been prefetched, the list displayed is the list of query completion suggestions received from the search system.

In alternative embodiments, the list displayed by operation 320 is always the list of query completion candidates generated by operation 314. The list of query completion candidates accounts for local information as previously discussed so the list of query completion candidates can be more relevant to a user than the general completion suggestions received by the search system. This can be accomplished by moving operation 314 to occur before operation 312 so that the query completion suggestions are always given to the trained machine learning model and the list of query completion candidates generated by the trained machine learning model and then displayed in operation 320. In this embodiment, the "no" branch of operation 312 would lead to operation 316.

In still other embodiments, the list displayed to the user by operation 320 can be a subset of the combination of the list of query completion suggestions and the list of query completion candidates.

The loop ends at operation 322.

Once a user enters a completed query, execution proceeds to operation 324 which identifies if the entered query matches the prefetch candidate used to retrieve results ("selected prefetch candidate") in operation 318. When determining if the selected prefetch candidate matches the completed query, different matching criteria can be used, depending on the embodiment. For example, a match can be declared if the selected prefetch candidate exactly matches the completed query. Additionally, or alternatively, a match can be declared if some portion and/or feature(s) of the selected prefetch candidate matches a portion and/or feature(s) of the completed query. For example, if a title of the selected prefetch candidate matches some portion of the completed query, then a match can be declared. As another example, a match can be declared if some portion of a URI associated with the selected prefetch candidate matches some portion of a URI associated with a completed query. Other types of matching logic can be used as well so that a match between the selected prefetch candidate and the completed query is declared in the absence of a full match between the two. Any combination of matching criteria can be used in operation 324 to determine whether a match occurs between the selected prefetch candidate and the completed query.

In operation 324 a match is determined as "no" if no prefetch was made.

If a match occurs between the completed query and the selected prefetch candidate, then the retrieved results are valid for the completed query and the prefetched results that have been stored in the hidden location (operation 318) are displayed in operation 326. For example, if the prefetched results were stored in a hidden tab, the hidden tab is made visible on the device. If the results are stored in another location, the results can be loaded into and displayed in a tab or otherwise made visible on the display.

Feedback is then sent to the machine learning model creation system in operation 332 indicating success in the prefetch (e.g., the selected prefetch candidate and the completed query matched in some way). A description of feedback has been previously given.

If no match is identified between the selected prefetch candidate and the completed query, the prefetched results are not valid for the completed query and the "no" branch out of operation 324 is taken. The prefetched results can be discarded if desired since they are not valid for the completed query. Operation 328 submits the completed query to the search system and receives results associated therewith. The results are then displayed in the browser in operation 330.

Feedback is then sent to the machine learning model creation system in operation 332 indicating failure in the prefetch if the selected prefetch candidate and the completed query didn't match or a no prefetch event if no prefetch was made. A description of feedback has been previously given.

The flow diagram ends at operation 334.

Figure 4:
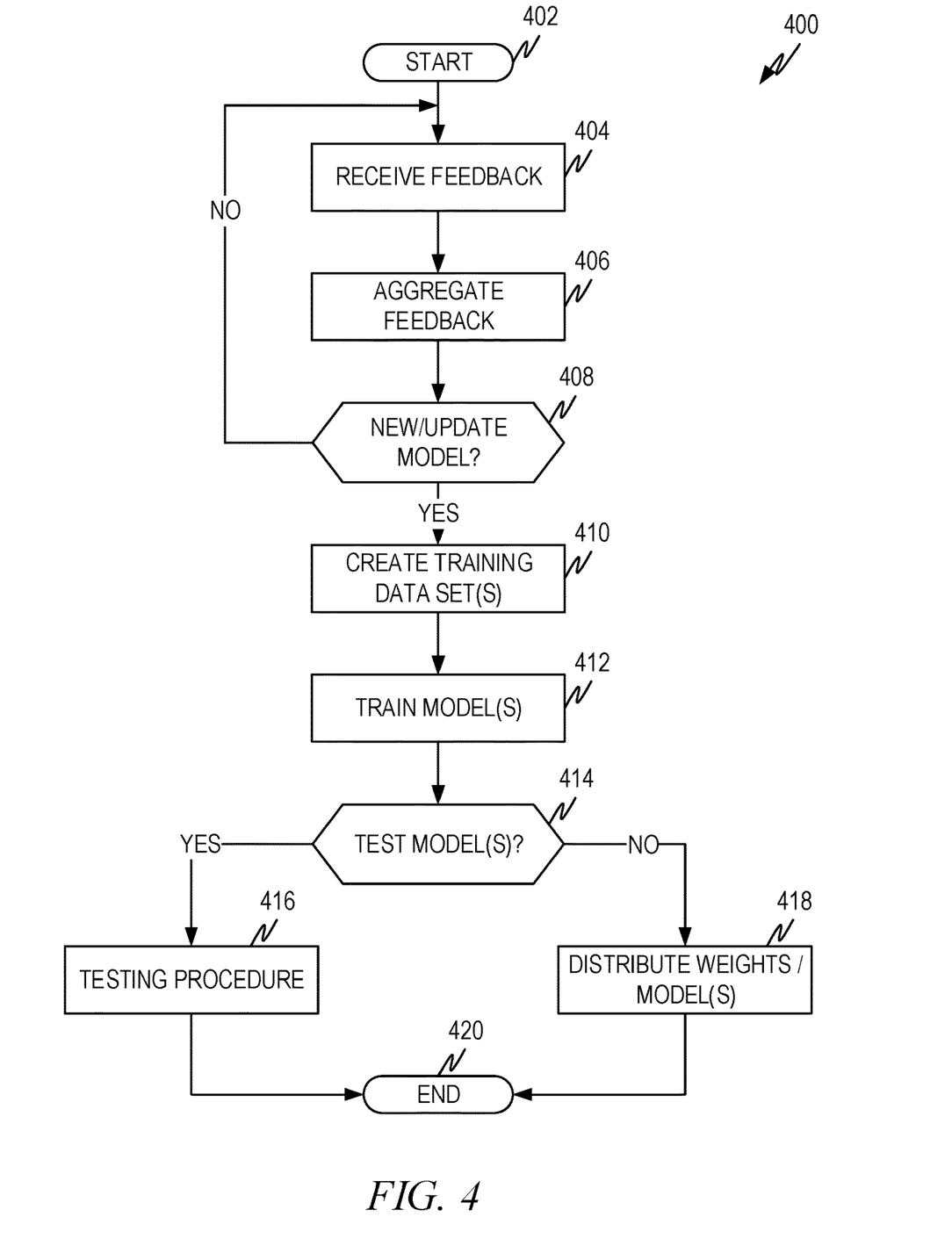
FIG. 4 illustrates a representative flow diagram for creation of a user-specific machine learning model according to some aspects of the present disclosure.

FIG. 4 illustrates a representative flow diagram 400 for creation of a user-specific machine learning model according to some aspects of the present disclosure. This flow diagram can be implemented, for example, by machine learning model creation system 106 of FIG. 1.

The flow diagram begins at operation 402 and proceeds to operation 404 where feedback is received from a user device, such as user device 102. Feedback has been previously described and represents information about, among other things, whether prefetch happened and if so, whether it was successful or not, with success as being defined as the prefetched results being relevant to the completed query.

Operation 406 aggregates the feedback in a manner that it can be used to create training data set(s) as described below. This entails storing the incoming feedback in a data store, such as data store 120 of FIG. 1. How the data is stored may depend on whether the training data sets that will be created from the feedback (see operation 410 below) are to be created for all users, for a user cohort, or on some other basis. Additionally, or alternatively, data preprocessing on the feedback can occur to place the feedback in a standard format for later processing. Data preprocessing can include eliminating data feedback that has missing or incomplete data and/or fill in the missing or incomplete data.

Individual data points can be stored in a format that enables retrieval of the information for creation of data sets and/or identification of trigger events (see operation 408). In some embodiments, data sets will be created based on all users with no segmentation by user. In these embodiments, it is sufficient to store the feedback fields, in raw, normalized, or summary format, without consideration to the user device that sent the feedback data. In these embodiments, the training data will be based on all users. In other embodiments, the feedback can be segmented by user cohort.

As explained above, a user cohort is a group of users that have one or more similarities such as similarities in user profile, similarities in local user data (browser history, favorites), and so forth. The similarities (segmentation dimensions) that are used to segment users into cohorts can be based on privacy concerns so that when private user data is not available or when it would violate a user's privacy to consider such data, the segmentation dimensions will not include private data. With a user's knowledge and consent, some embodiments can use private data as segmentation dimension(s).

The received feedback data is then stored with the segmentation dimension(s) and/or user cohort information so that the data can be retrieved by segmentation dimension(s) and/or user cohort.

Operation 408 identifies whether a trigger event has occurred. If not, execution proceeds back to operation 404 where additional feedback is received. If the trigger event has occurred, execution proceeds to operation 410, discussed below.

Due to the number of queries processed each second by the search system and the amount of feedback received by the machine learning model creation system, a sufficient amount of data to retrain the model can be received very quickly. The trigger event can comprise one or more of:

Time (e.g., according to a periodic or aperiodic schedule);
Amount of data received (e.g., a sufficiently large sample to train/update the model);
Performance (e.g., number of successes fall below a threshold, rate or percentage of success falls below a threshold, number of failures exceeds a threshold, rate or percentage of failure exceed a threshold, combinations thereof);
Testing (see operation 416 described below) indicates an update should be made; and
Other events.

Where performance is all or part of a trigger event, the performance can be calculated from the stored feedback or can be maintained in a running calculation as feedback comes in. For example, if success percentage is one of the trigger event components, each point of feedback received can be examined and, when a prefetch was performed, the success or failure of the prefetch can be maintained in a running counter. This number can be divided by the total number of data feedback points received to create a success percentage. This success percentage can then be compared to a threshold to determine whether a trigger event has occurred. Other calculations can similarly be maintained.

Upon occurrence of the trigger event(s), the "yes" branch out of operation 408 is taken to operation 410. Operation 410 utilizes the aggregated feedback to create one or more training data sets. Creation of training data sets can be for all users, for one or more user cohorts, for a set of test users, and so forth. How the training data set(s) are created depends on whether supervised, semi-supervised, or unsupervised learning is to be used to train the machine learning model. The operations to create a training data set involve mapping received feedback to standard training data set fields.

As an example, suppose the feedback received from user devices includes the following:

An indicator as to whether a prefetch was performed;
An indication of whether the selected prefetch candidate matched the completed query;
The confidence level associated with the selected prefetch candidate;
A subset of the query completion suggestion list received from the search system 104;
The completed query;
Which features (title, URL, etc.) that matched between the selected prefetch candidate and the completed query;
Whether the selected prefetch candidate was drawn from local information (e.g., a favorite or an entry from the browser history); and
If a selected prefetch candidate was drawn from local information, how long ago was the selected prefetch candidate clicked on (i.e., a time measure since the user visited the selected prefetch candidate).

From this a supervised training data point can be created, based on dividing the feedback into what was input, what was output, and whether that was successful or not and/or what should have happened. This latter represents the annotation portion of the data point. The combination thus represents an annotated data point that can become part of a supervised training data set.

The training data sets can be based on any or all of the feedback previously described so that the training data set has a plurality of data points, each data point having input information to the machine learning model as described above and, if the training data set is for supervised or semi-supervised training, the correct output for the input data.

The number and type of training data sets can be based on whether a testing procedure such as that described in operation 416 below is going to be used. Additionally, or alternatively, the number and type of training data sets can be based on the number and type of machine learning models that are to be trained, whether one or more new models are to be created, and/or whether one or more models are to be updated (as opposed to newly created).

New model(s) are created and/or existing model(s) updated in operation 412 using the training data sets created from the feedback in operation 410. The decision as to whether to create a new model or update an existing model can be based on considerations such as performance of the existing model, whether a new model type should be tested, administrator input, and so forth.

A new model can be created in the form a plug-in, script file, and/or other executable format that is transferred to user devices. When the user devices receive the new models, they can install them using the appropriate methodology. For example, a plug-in can be installed using the browser plug in infrastructure. A script file can be installed by placing the script file in the appropriate location and ensuring it is accessible by the browser, and so forth. The details of how the new model is installed depends on the infrastructure in use and the form of the new model.

Updated models are crated in the form of updated weights, parameters, and so forth that a trained model uses. The particular weights, parameters and so forth depend upon the type of machine learning model utilized. Once the particular machine learning type is selected, those of skill in the art will know how to train the model using the created data sets.

Once the updated and/or new model(s) are created in operation 412, operation 414 identifies if the model should be part of a testing procedure (operation 416) or whether it is simply distributed to new and/or existing users (operation 418). If distributed to new and/or existing users in operation 418, the system takes the model and/or the updated model parameters, identifies the user(s) that it should be distributed to, and sends out the model/model parameters. The group of users that should receive it are the cohort, if the model was trained for a cohort, or to all uses if the model was trained for all users. In other words, the model is distributed to those user devices for which it was trained.

Operation 416 represents the implementation of a testing procedure. As previously discussed, the system can utile an A/B testing procedure or other testing procedures. In an A/B testing procedure, a new model and/or model parameters are distributed to a test group of user devices. The performance of the test group is monitored for a period of time and if the new model performs better than the old model, the new model is pushed to the remainder of the users. In this situation performance is measured by one or more metrics that either indicate a greater success rate in prefetching, a lower failure rate in prefetching, or both. Rather than only a single test model being run at once, several models can be tested simultaneously and the best performing model selected as the model to be distributed. Additionally, or alternatively, testing can be done on an aggregate user device basis, on a user cohort basis, or in another fashion.

The flow diagram ends at operation 420.

Figure 5:
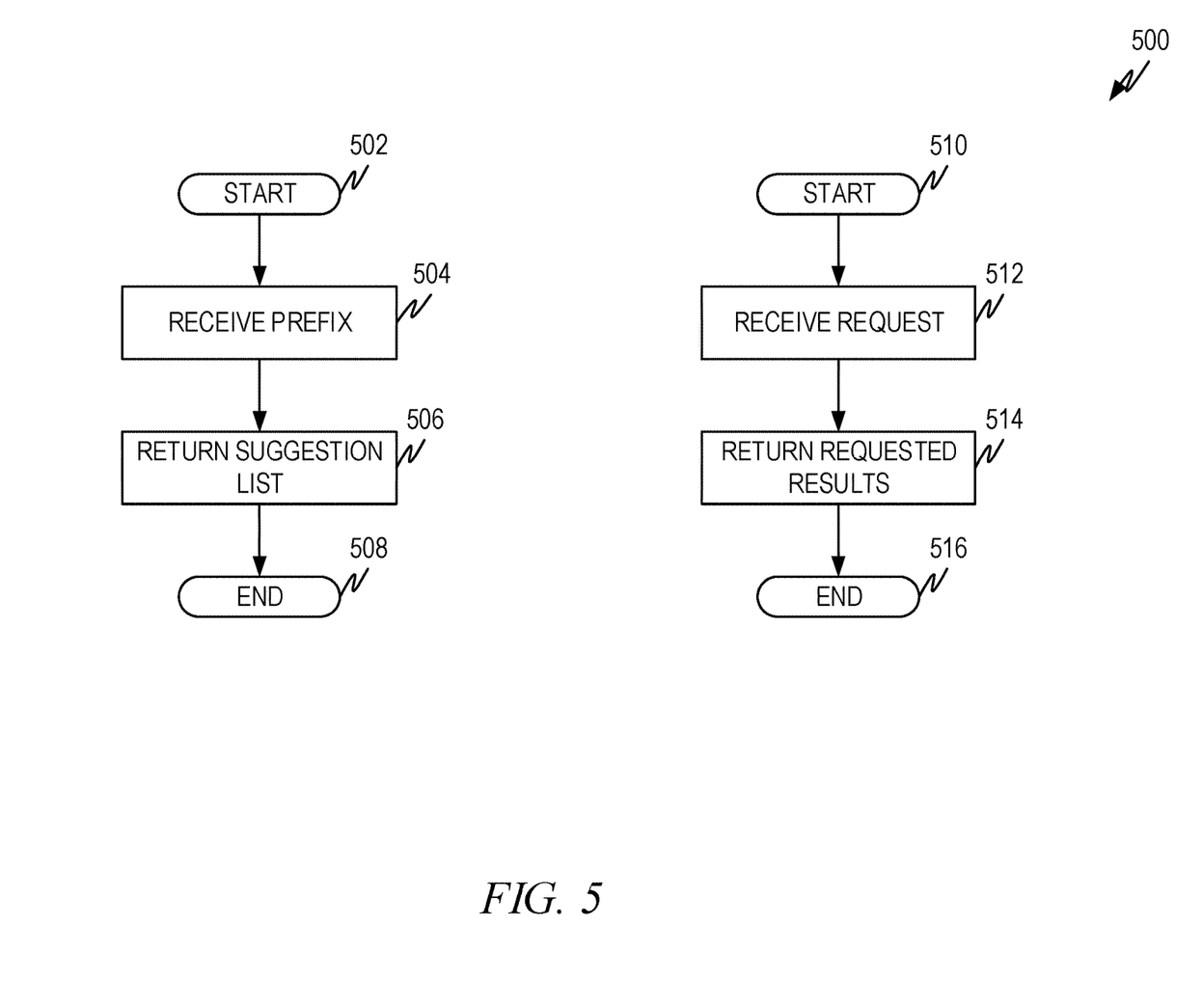
FIG. 5 illustrates a representative flow diagram for a search system according to some aspects of the present disclosure.

FIG. 5 illustrates a representative flow diagram 500 for a search system according to some aspects of the present disclosure. FIG. 5 includes two diagrams, that describe what the search system does in the present disclosed embodiments.

In one diagram, the flow diagram begins at operation 502, and the search system receives a query prefix at operation 504. In response, the search system returns a list of query suggestions in operation 506. As described herein the list of query suggestions can be ranked and/or each entry can have an associated confidence level. The flow diagram ends at operation 508.

In the other diagram, the flow diagram begins at operation 510, and the search system receives a completed query or selected query candidate at operation 512. The results are returned in operation 514 and the flow diagram ends at operation 516.

Example Machine Architecture and Machine-Readable Medium

Figure 6:
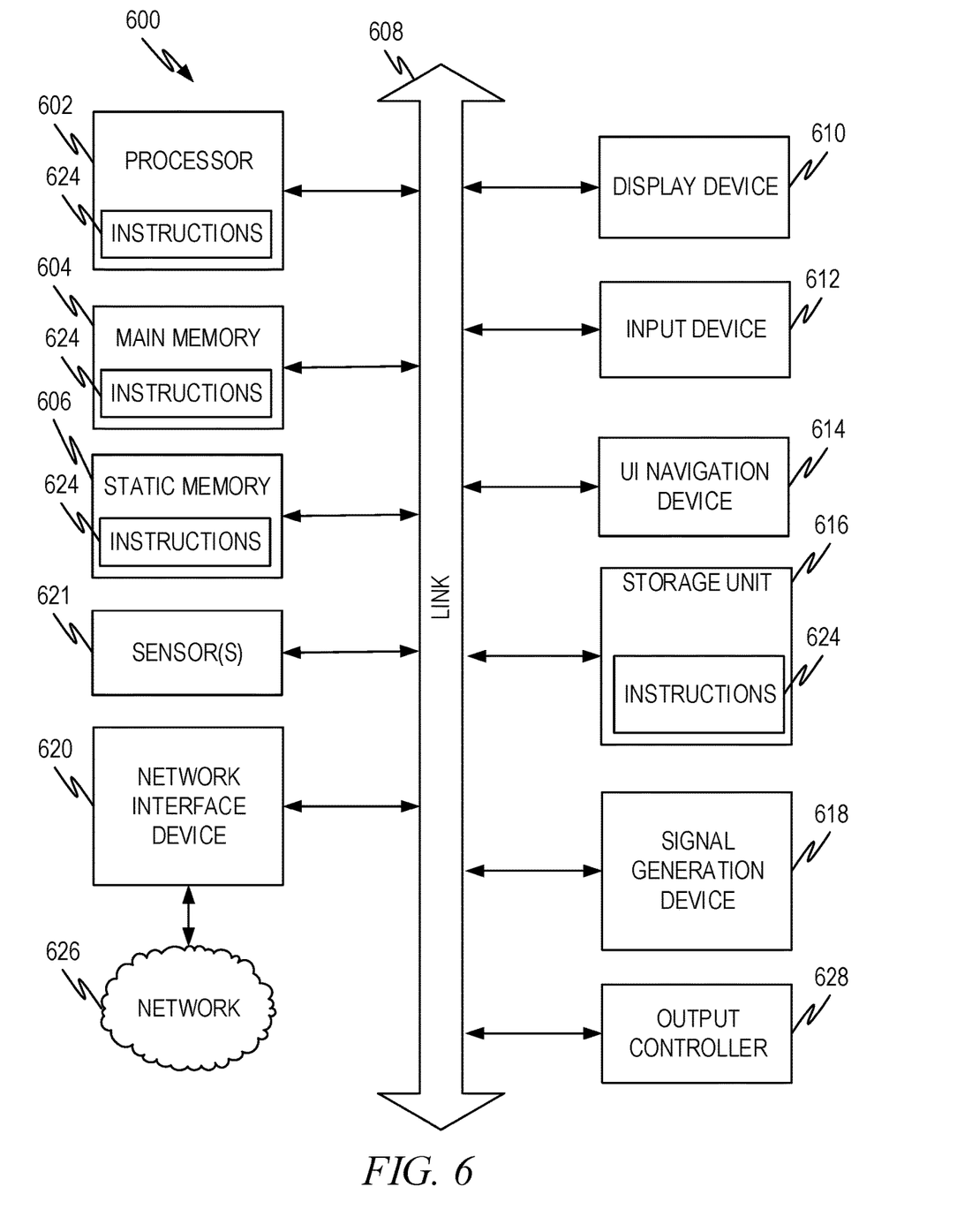
FIG. 6 illustrates a representative machine architecture suitable for implementing the systems and other aspects disclosed herein or for executing the methods disclosed herein.

FIG. 6 illustrates a representative machine architecture suitable for implementing the systems and other aspects disclosed herein or for executing the methods disclosed herein. The machine of FIG. 6 is shown as a standalone device (such as the mobile devices described herein), which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 6 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 600 includes at least one processor 602 (e.g., a central processing unit (CPU), a graphics processing unit (GPU), advanced processing unit (APU), or combinations thereof), one or more memories such as a main memory 604, a static memory 606, or other types of memory, which communicate with each other via link 608. Link 608 may be a bus or other type of connection channel. The machine 600 may include further optional aspects such as a graphics display unit 610 comprising any type of display. The machine 600 may also include other optional aspects such as an alphanumeric input device 612 (e.g., a keyboard, touch screen, and so forth), a user interface (UI) navigation device 614 (e.g., a mouse, trackball, touch device, and so forth), a storage unit 616 (e.g., disk drive or other storage device(s)), a signal generation device 618 (e.g., a speaker), sensor(s) 621 (e.g., global positioning sensor, accelerometer(s), microphone(s), camera(s), an eye tracking subsystem, and so forth), output controller 628 (e.g., wired or wireless connection to connect and/or communicate with one or more other devices such as a universal serial bus (USB), near field communication (NFC), infrared (IR), serial/parallel bus, etc.), and a network interface device 620 (e.g., wired and/or wireless) to connect to and/or communicate over one or more networks 626.

Rather than the more conventional microprocessor, Neural Network chips can be used to implement embodiments of the present disclosure. Neural Network chips are specialized chips designed to execute various forms of neural networks. As such, they are suitable for use in implementing aspects of the present disclosure such as the machine learning models and other neural network aspects of the present disclosure. Based on the disclosure contained herein, those of skill in the art will know how to implement the embodiments of the present disclosure using one or more neural network chips.

Executable Instructions and Machine-Storage Medium

The various memories (i.e., 604, 606, and/or memory of the processor(s) 602) and/or storage unit 616 may store one or more sets of instructions and data structures (e.g., software) 624 embodying or utilized by any one or more of the methodologies or functions described herein. These instructions, when executed by processor(s) 602 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, and other such transitory media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

EXAMPLE EMBODIMENTS

Example 1

A computer implemented method executed by a user device, comprising:

receiving input representing a query prefix;

submitting the query prefix to a search system and, responsive to the submitting, receiving a list of query completion suggestions from the search system;

presenting the list of query completion suggestions, browser history from the user device, and user favorites from the user device to a trained machine learning model;

responsive to the presenting, receiving from the trained machine learning model a prefetch candidate;

identifying a confidence level associated with the prefetch candidate;

responsive to the confidence level exceeding a threshold, submitting the prefetch candidate to a search service and receiving results in response from the search service;

responsive to receiving a completed query, identifying whether the prefetch candidate matches the completed query; and submitting feedback on the trained machine learning model, the feedback being used by a machine learning model creation system to update the trained machine learning model.

Example 2

The method of example 1 wherein the submitted feedback is sent to a system that trains and updates machine learning models and wherein the method further comprises receiving the trained machine learning model, an updated set of machine learning model coefficients, or both.

Example 3

The method of example 1 wherein the feedback comprises one or more of:

an indication of whether the prefetch candidate matched the completed query;

the confidence level associated with the prefetch candidate;

one or more features that matched between the prefetch candidate and the completed query; and an indication of whether the prefetch candidate was retrieved.

Example 4

The method of example 3 wherein the one or more features comprises at least one of:

a title of an entry in the browser history or an entry in the user favorites; or a uniform resource indicator.

Example 5

The method of example 3 wherein the feedback further comprises a time measure that indicates how long ago a user visited the prefetch candidate.

Example 6

The method of example 1 further comprising responsive to the confidence level not exceeding the threshold refraining from submitting the prefetch candidate to the search service.

Example 7

The method of example 1 wherein each query completion suggestion in the list of query completion suggestions has an associated confidence level.

Example 8

The method of example 1 wherein responsive to the presenting, the trained machine learning model returns a plurality of prefetch candidates.

Example 9

The method of example 1 further comprising presenting additional information from a federated data source to the trained machine learning model along with the list of query completion suggestions, user history, and user favorites.

Example 10

A system comprising:
a processor and device-storage media having executable instructions which, when executed by the processor, cause the system to perform operations comprising:
receiving a query prefix;
submitting the query prefix to a search system and, responsive to the submitting, receiving a ranked list of query completion suggestions from the search system;
presenting the ranked list of query completion suggestions, browser history, and user favorites to a trained machine learning model;
responsive to the presenting, receiving from the trained machine learning model a prefetch candidate;
identifying a confidence level associated with the prefetch candidate;
responsive to the confidence level exceeding a threshold, submitting the prefetch candidate to a search service and receiving results in response from the search service;
responsive to receiving a completed query, identifying whether the prefetch candidate matches the completed query; and
submitting feedback on the trained machine learning model.

Example 11

The system of example 10 wherein the operations further comprise receiving the trained machine learning model, an updated set of machine learning model coefficients, or both.

Example 12

The system of example 10 wherein the feedback comprises one or more of:
an indication of whether the prefetch candidate matched the completed query;
the confidence level associated with the prefetch candidate;
one or more features that matched between the prefetch candidate and the completed query; and
an indication of whether the prefetch candidate was retrieved.

Example 13

The system of example 12 wherein the one or more features comprises at least one of:
a title of an entry in the browser history or an entry in the user favorites; or
a uniform resource indicator.

Example 14

The system of example 12 wherein the feedback further comprises a time measure that indicates how long ago a user visited the prefetch candidate.

Example 15

The system of example 10 wherein the operations further comprise responsive to the confidence level not exceeding the threshold refraining from submitting the prefetch candidate to the search service.

Example 16

A computer implemented method executed by a user device, comprising:
receiving input representing a query prefix;
submitting the query prefix to a search system and, responsive to the submitting, receiving a list of query completion suggestions from the search system;
presenting the list of query completion suggestions, browser history from the user device, and user favorites from the user device to a trained machine learning model;
responsive to the presenting, receiving a prefetch candidate from the trained machine learning model;
identifying a confidence level associated with the prefetch candidate;
responsive to the confidence level exceeding a threshold, submitting the prefetch candidate to a search service and receiving results in response from the search service;
responsive to receiving a completed query, identifying whether the prefetch candidate matches the completed query; and
submitting feedback on the trained machine learning model, the feedback being used by a machine learning model creation system to update the trained machine learning model.

Example 17

The method of example 16 wherein the submitted feedback is sent to a system that trains and updates machine learning models and wherein the method further comprises receiving the trained machine learning model, an updated set of machine learning model coefficients, or both.

Example 18

The method of example 16 or 17 wherein the feedback comprises one or more of:
an indication of whether the prefetch candidate matched the completed query;

the confidence level associated with the prefetch candidate;

one or more features that matched between the prefetch candidate and the completed query; and an indication of whether the prefetch candidate was retrieved.

Example 19

The method of example 18 wherein the one or more features comprises at least one of:

a title of an entry in the browser history or a title of an entry in the user favorites; or a uniform resource indicator.

Example 20

The method of example 18 wherein the feedback further comprises a time measure that indicates how long ago a user visited the prefetch candidate.

Example 21

The method of example 16, 17, 18, 19, or 20 further comprising responsive to the confidence level not exceeding the threshold refraining from submitting the prefetch candidate to the search service.

Example 22

The method of example 16, 17, 18, 19, 20, or 21 wherein each query completion suggestion in the list of query completion suggestions has an associated confidence level.

Example 23

The method of example 16, 17, 18, 19, 20, 21, or 22 wherein responsive to the presenting, the trained machine learning model returns a plurality of prefetch candidates.

Example 24

The method of example 16, 17, 18, 19, 20, 21, 22, or 23 further comprising presenting additional information from a federated data source to the trained machine learning model along with the list of query completion suggestions, user history, and user favorites.

Example 25

The method of example 16, 17, 18, 19, 20, 21, 22, 23, or 24 the feedback comprises whether the prefetch candidate was drawn from the browser history or user favorites or both.

Example 26

The method of example 16, 17, 18, 19, 20, 21, 22, 23, 24, or 25 further comprising:

identifying whether a prefetch has previously been made while input was received;

responsive to identifying that a prefetch has previously been made, refraining from issuing another prefetch request independent of whether the confidence level exceeds the threshold.

Example 27

The method of example 16, 17, 18, 19, 20, 21, 22, 23, 24, 25, or 26 further comprising loading received prefetch results in a hidden location.

Example 28

The method of example 27 wherein the hidden location is a hidden tab in a browser.

Example 29

An apparatus comprising means to perform a method as in any preceding example.

Example 30

Machine-readable storage including machine-readable instructions, when executed, to implement a method or realize an apparatus as in any preceding example.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A computer implemented method executed by a user device, comprising:

receiving input representing a query prefix;

submitting the query prefix to a search system and, responsive to the submitting, receiving a list of query completion suggestions from the search system;

presenting the list of query completion suggestions, browser history from the user device, and user favorites from the user device to a trained machine learning model;

responsive to the presenting, receiving from the trained machine learning model a prefetch candidate;

identifying a confidence level associated with the prefetch candidate;

responsive to the confidence level exceeding a threshold, submitting the prefetch candidate to a search service and receiving results in response from the search service;

obtaining a completed query;

responsive to obtaining the completed query, identifying whether the prefetch candidate matches the completed query; and submitting feedback on the trained machine learning model, the feedback being used by a machine learning model creation system to update the trained machine learning model.

2. The method of claim 1 wherein the submitted feedback is sent to a system that trains and updates machine learning models and wherein the method further comprises receiving the trained machine learning model, an updated set of machine learning model coefficients, or both.

3. The method of claim 1 wherein the feedback comprises one or more of:
   an indication of whether the prefetch candidate matched the completed query;
   the confidence level associated with the prefetch candidate;
   one or more features that matched between the prefetch candidate and the completed query; and
   an indication of whether the prefetch candidate was retrieved.

4. The method of claim 3 wherein the one or more features comprises at least one of:
   a title of an entry in the browser history or an entry in the user favorites; or
   a uniform resource indicator.

5. The method of claim 3 wherein the feedback further comprises a time measure that indicates how long ago a user visited the prefetch candidate.

6. The method of claim 1 further comprising responsive to the confidence level not exceeding the threshold refraining from submitting the prefetch candidate to the search service.

7. The method of claim 1 wherein each query completion suggestion in the list of query completion suggestions has an associated confidence level.

8. The method of claim 1 wherein responsive to the presenting, the trained machine learning model returns a plurality of prefetch candidates.

9. The method of claim 1 further comprising presenting additional information from a federated data source to the trained machine learning model along with the list of query completion suggestions, user history, and user favorites.

10. A system comprising:
    a processor and device-storage media having executable instructions which, when executed by the processor, cause the system to perform operations comprising:
       receiving a query prefix;
       submitting the query prefix to a search system and, responsive to the submitting, receiving a ranked list of query completion suggestions from the search system;
       presenting the ranked list of query completion suggestions, browser history, and user favorites to a trained machine learning model;
       responsive to the presenting, receiving a prefetch candidate from the trained machine learning model;
       identifying a confidence level associated with the prefetch candidate;
       responsive to the confidence level exceeding a threshold, submitting the prefetch candidate to a search service and receiving results in response from the search service;
       receiving a completed query;
       responsive to receiving the completed query, identifying whether the prefetch candidate matches the completed query; and
       submitting feedback on the trained machine learning model.

11. The system of claim 10 wherein the operations further comprise receiving the trained machine learning model, an updated set of machine learning model coefficients, or both.

12. The system of claim 10 wherein the feedback comprises one or more of:
    an indication of whether the prefetch candidate matched the completed query;
    the confidence level associated with the prefetch candidate;
    one or more features that matched between the prefetch candidate and the completed query; and
    an indication of whether the prefetch candidate was retrieved.

13. The system of claim 12 wherein the one or more features comprises at least one of:
    a title of an entry in the browser history or an entry in the user favorites; or
    a uniform resource indicator.

14. The system of claim 12 wherein the feedback further comprises a time measure that indicates how long ago a user visited the prefetch candidate.

15. The system of claim 10 wherein the operations further comprise responsive to the confidence level not exceeding the threshold refraining from submitting the prefetch candidate to the search service.

16. The system of claim 10 wherein each query completion suggestion in the ranked list of query completion suggestions has an associated confidence level.

17. The system of claim 10 wherein responsive to the presenting, the trained machine learning model returns a plurality of prefetch candidates.

18. The system of claim 10 wherein the operations further comprise presenting additional information from a federated data source to the trained machine learning model along with the ranked list of query completion suggestions, browser history, and user favorites.

19. A computer storage media comprising executable instructions that, when executed by a processor of a machine, cause the machine to perform acts comprising:
    receiving, from a machine learning model training system, a trained machine learning model, the trained machine learning model being produced based on feedback received from a plurality of user devices;
    receiving a query prefix;
    submitting the query prefix to a search system and, responsive to the submitting, receiving a ranked list of query completion suggestions from the search system;
    presenting the ranked list of query completion suggestions, user history, and user favorites to a trained machine learning model;
    responsive to the presenting, receiving a prefetch candidate from the trained machine learning model;
    identifying a confidence level associated with the prefetch candidate;
    responsive to the confidence level exceeding a threshold, submitting the prefetch candidate to a search service and receiving results in response from the search service;
    receiving a completed query;
    responsive to receiving the completed query, identifying whether the prefetch candidate matches the completed query; and
    submitting feedback on the trained machine learning model to the machine learning model training system.

20. The media of claim 19 wherein the feedback comprises one or more of:
    an indication of whether the prefetch candidate matched the completed query;
    the confidence level associated with the prefetch candidate;
    one or more features that matched between the prefetch candidate and the completed query; and
    an indication of whether the prefetch candidate was retrieved.

* * * * *